US008792722B2

(12) United States Patent
Liu et al.

(10) Patent No.: US 8,792,722 B2
(45) Date of Patent: *Jul. 29, 2014

(54) HAND GESTURE DETECTION

(75) Inventors: Ming-Chang Liu, San Jose, CA (US);
Liangyin Yu, Fremont, CA (US); Quan Yuan, San Jose, CA (US)

(73) Assignee: Sony Corporation, Tokyo (JP)

( * ) Notice: Subject to any disclaimer, the term of this patent is extended or adjusted under 35 U.S.C. 154(b) by 803 days.

This patent is subject to a terminal disclaimer.

(21) Appl. No.: 12/848,913

(22) Filed: Aug. 2, 2010

(65) Prior Publication Data

US 2012/0027252 A1 Feb. 2, 2012

(51) Int. Cl.
*G06K 9/00* (2006.01)

(52) U.S. Cl.
USPC .......................................................... 382/181

(58) Field of Classification Search
USPC .......................................................... 382/181
See application file for complete search history.

(56) References Cited

U.S. PATENT DOCUMENTS

| 5,594,469 | A | 1/1997 | Freeman et al. |
| 6,236,736 | B1 * | 5/2001 | Crabtree et al. ............. 382/103 |
| 6,788,809 | B1 | 9/2004 | Grzeszczuk et al. |
| 6,901,110 | B1 * | 5/2005 | Tsougarakis et al. .... 375/240.12 |
| 7,054,847 | B2 * | 5/2006 | Hartman et al. ................. 706/12 |
| 7,110,569 | B2 * | 9/2006 | Brodsky et al. ............... 382/103 |
| 7,274,803 | B1 | 9/2007 | Sharma et al. |
| 7,657,100 | B2 * | 2/2010 | Gokturk et al. ............... 382/209 |
| 7,853,072 | B2 * | 12/2010 | Han et al. ...................... 382/155 |
| 2005/0280809 | A1 * | 12/2005 | Hidai et al. ................. 356/237.3 |
| 2009/0087028 | A1 * | 4/2009 | Lacey et al. ................... 382/103 |
| 2010/0202663 | A1 * | 8/2010 | Kim et al. ...................... 382/107 |

OTHER PUBLICATIONS

Huo. F. et al., "Detection Tracking and Recognition of Human Poses for a Real Time Spatial Game."*GATE (Game Research for Training and Entertainment) Project*, pp. 43-51, 2009.
Malik, S. "Real-time Hand Tracking and Finger Tracking for Interaction," *CSC2503F Project Report* (2003), 21 pages.
My Digital Life, "Control Your TV with Hand Gestures," *Hands in the News* (2008), 2 pages.
Yeung, C. et al., "Vision-Based Hand Gesture Interactions for Large LCD-TV Display Tabletop Systems," *Advances in Multimedia Information Processing—PCM* (2008), 2 pages.

* cited by examiner

*Primary Examiner* — Chan Park
*Assistant Examiner* — Elisa Rice
(74) *Attorney, Agent, or Firm* — Haverstock & Owens LLP

(57) ABSTRACT

A method for detecting presence of a hand gesture in video frames includes receiving video frames having an original resolution, downscaling the received video frames into video frames having a lower resolution, and detecting a motion corresponding to the predefined hand gesture in the downscaled video frames based on temporal motion information in the downscaled video frames. The method also includes detecting a hand shape corresponding to the predefined hand gesture in a candidate search window within one of the downscaled video frames using a binary classifier. The candidate search window corresponds to a motion region containing the detected motion. The method further includes determining whether the received video frames contain the predefined hand gesture based on the hand shape detection.

20 Claims, 11 Drawing Sheets

SAME RANGE IN
REFERENCE FRAME
804

HAND SEARCH RANGE IN
CURRENT FRAME
802

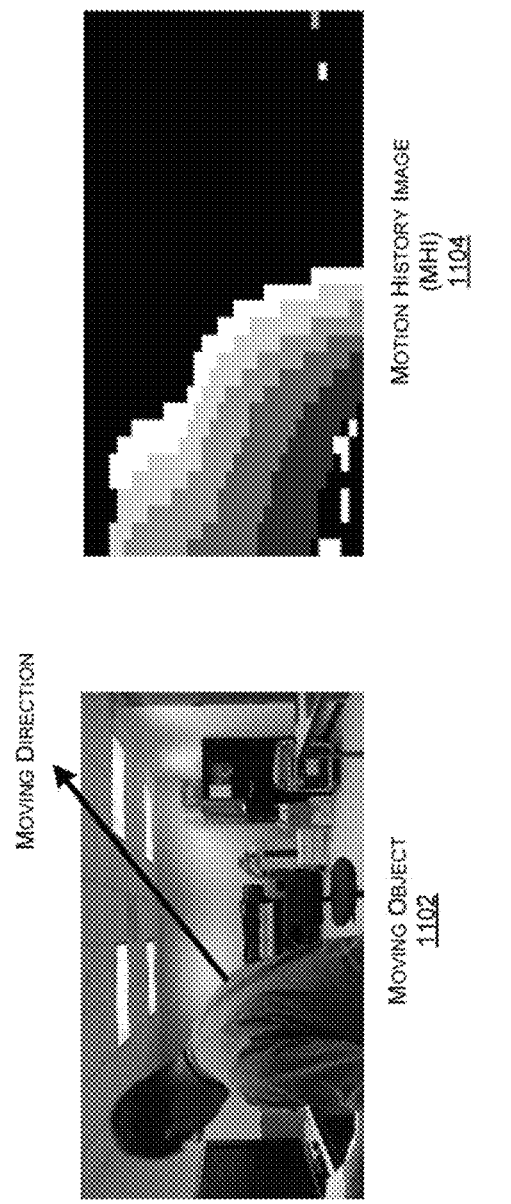

HAND GESTURE DETECTION

TECHNICAL FIELD

The present disclosure relates to methods and systems for detecting a hand gesture such as, for example, a greeting gesture, using a single-camera system.

BACKGROUND

Existing hand gesture detection technologies all have some limitations. For example, some of them require complex and/or expensive equipment, such as depth sensors, stereo cameras, multiple cameras, or infra red cameras. Others perform complicated and expensive computations of image depth data. Some existing technologies only use skin colors, which are not accurate and sometimes cannot distinguish faces or background. Still other existing technologies are limited to only detecting and recognizing a particular hand whose pictures are previously captured and stored by the system while others rely on correlation between a hand and other parts of a body to detect and recognize expected hand gestures. Some existing technologies cannot recognize small hands and can cause speed issues when searching for small hands. Some existing technologies fail to utilize motion information to reduce searches to a small region and thus causes searches slow.

Thus, there is a need to develop a simple single-camera system that can efficiently detect and recognize a hand gesture and overcome the limitations of prior art systems.

SUMMARY

The present disclosure includes an exemplary method for detecting presence of a hand gesture in video frames. Embodiments of the method include receiving video frames having an original resolution, downscaling the received video frames into video frames having a lower resolution, and detecting a motion corresponding to the predefined hand gesture in the downscaled video frames based on temporal motion information in the downscaled video frames. Embodiments of the method may also include detecting a hand shape corresponding to the predefined hand gesture in a candidate search window within one of the downscaled video frames using a binary classifier. The candidate search window corresponds to a motion region containing the detected motion. Embodiments of the method may further include determining whether the received video frames contain the predefined hand gesture based on the hand shape detection.

An exemplary system in accordance with the present disclosure comprises a camera configured to capture images having an original resolution and a gesture detector coupled to the camera. The gesture detector is configured to downscale the captured images into images having a lower resolution and determine a motion region by detecting a motion corresponding to a predefined hand gesture in the downscaled images based on a motion history image (MHI) and a plurality of motion templates. The MHI represents recency of motions in the downscaled images, and the plurality of motion templates correspond to the predefined hand gesture performed at different speed. In some embodiments, the gesture detector also refines the motion region by filtering out a false motion based on configuration information of the predefined hand gesture and the detected motion, and determines a hand region by detecting a hand shape corresponding to the predefined hand gesture in a candidate search window using a linear classifier, wherein the candidate search window is within one of the downscaled images and corresponds to the refined motion region. In some embodiments, the gesture detector also refines the hand region by filtering out a false skin region based on hand skin colors, and determines whether the captured images contain the predefined hand gesture by verifying the detected hand shape in the refined hand region using a nonlinear classifier.

It is to be understood that both the foregoing general description and the following detailed description are exemplary and explanatory only and are not restrictive of the invention, as claimed.

BRIEF DESCRIPTION OF THE DRAWINGS

FIG. 11 illustrates an exemplary embodiment of false hand motion removal.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Methods and systems disclosed herein have many practical applications. For example, exemplary embodiments may be used to detect a hand gesture that may be used to control a television, computer, or basically any device. For example, any device that currently receives input from a human may be adapted to be remotely controlled by or interacted with by displaying a hand gesture to a system implementing methods disclosed herein. The methods and systems described herein may be used, for example, to detect hand gestures that may control or interact with software being operated by a computing device, such as, for example, a video game, word processor, or personal digital assistant (PDA). The methods and systems disclosed herein may also be used to recognize hand gestures for the purposes of communication and/or identification.

Figure 1:
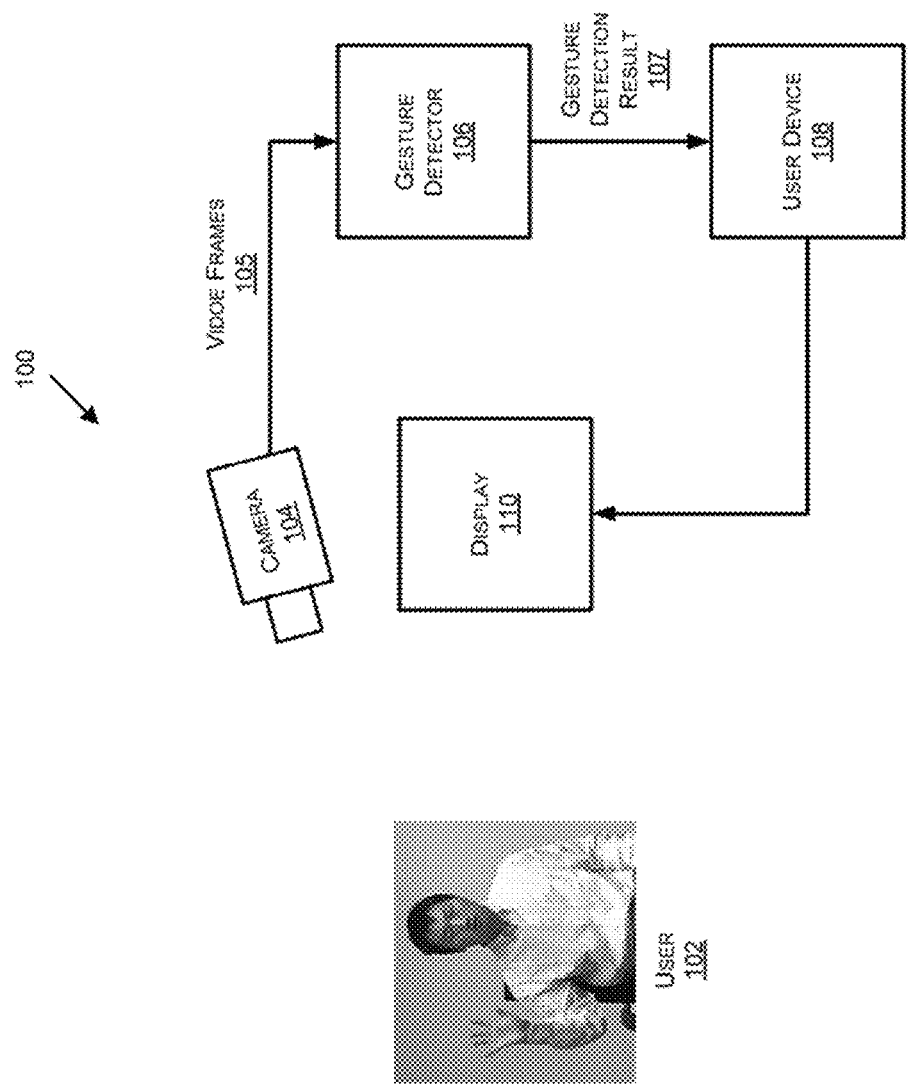
FIG. 1 illustrates a block diagram of an exemplary system consistent with the presently-claimed invention.

FIG. 1 illustrates a block diagram of an exemplary system 100 consistent with the presently-claimed invention. As shown in FIG. 1, exemplary system 100 includes a camera 104, a gesture detector 106, a user device 108, and a display 110, operatively connected to one another via a network or any type of communication links that allow transmission of data from one component to another, whether wired or wireless. The network may include Local Area Networks (LANs) and/or Wide Area Networks (WANs), and may be wireless, wired, or a combination thereof.

Camera 104 may be any type of image capture device. In some embodiments, camera 104 has a single lens or does not capture image depth data. Camera 104 may acquire images in color or in black and white. Camera 104 can be, for example, a photo or video camera. Camera 104 may capture digital or analog data. If Camera 104 captures non-digital image data, the captured images may be converted to digital data by camera 104 or, as mentioned below, by gesture detector 106.

In the exemplary embodiment shown in FIG. 1, camera 104 is coupled to gesture detector 106 and provides captured video frames 105 to gesture detector 106. In certain embodiments, video may be captured at a low frame rate, for example, as low as 10 frames/second.

Gesture detector 106 can be implemented as a software program and/or hardware that detects a user's hand gesture based on video frames captured by camera 104. Gesture detector 106 can, by means of included software applications, transform received video frames into digital format, if not already in digital format. Gesture detector 106 provides a gesture detection result 107 to user device 108. Gesture detection will be further described below.

User device 108 may be, for example, a computer, a personal digital assistant (PDA), a cell phone or smartphone, a laptop, a desktop, an audio or video content player, a television set including a broadcast tuner, a radio set including a broadcast tuner, video game controller, or any electronic device capable of providing graphical user interfaces or playing audio or video. User device 108 may include software applications that allow device 108 to communicate with and receive content, such as a graphical user interface (GUI), audio, or video, from a network or local storage medium. In some embodiments, user device 108 can receive graphical content from a web server, an enterprise server, or any other type of computer server through a network. In other embodiments, user device 108 can receive content from a broadcasting facility, such as free-to-air, cable, satellite, and other broadcasting facility, for distributing the content through a data network.

Display 110 is a display device. Display 110 may be, for example, a television, monitor, projector, display panel, and any other display device.

While shown in FIG. 1 as separate components that are operatively connected, any or all of camera 104, gesture detector 106, user device 108, and display 110 may be co-located in one device. For example, camera 104 can be located within or part of gesture detector 106 or user device 108, gesture detector 106 can be located within or part of user device 108 or display 110, and display 110 can be located within or part of user device 108. It is understood that the configuration shown in FIG. 1 is for illustrative purposes only. Certain devices may be removed or combined and other devices may be added.

An exemplary method for hand gesture detection will now be described. In general, methods disclosed herein have two stages. In a first stage, a search area is determined by detecting areas of motion in video frames using motion templates in motion history images. The first stage reduces the scope of possible hand gesture locations in the video frames to limited areas. In a second stage, the search area is searched to detect and identify the particular hand gesture.

Figure 2:
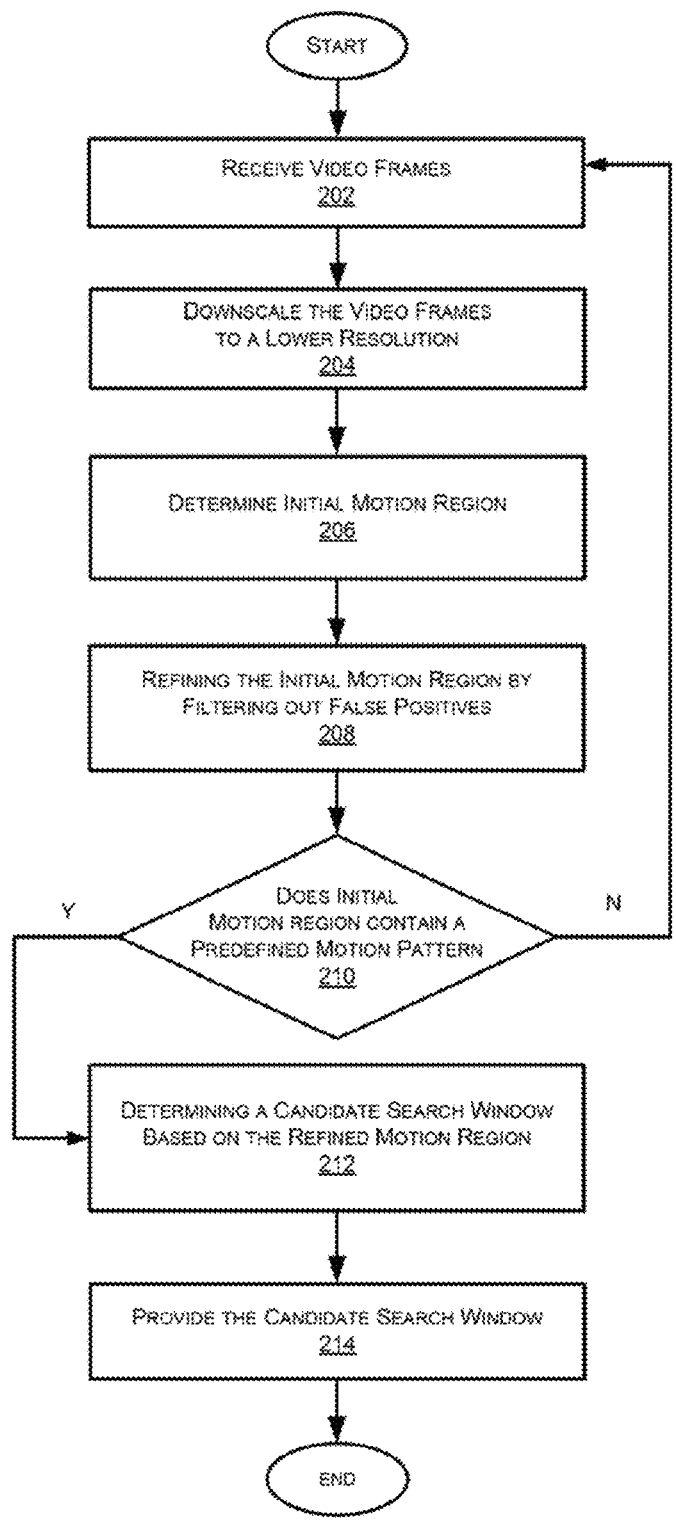
FIG. 2 is a flow chart illustrating an exemplary first stage of determining a candidate search area for use in hand gesture detection.
Figure 3:
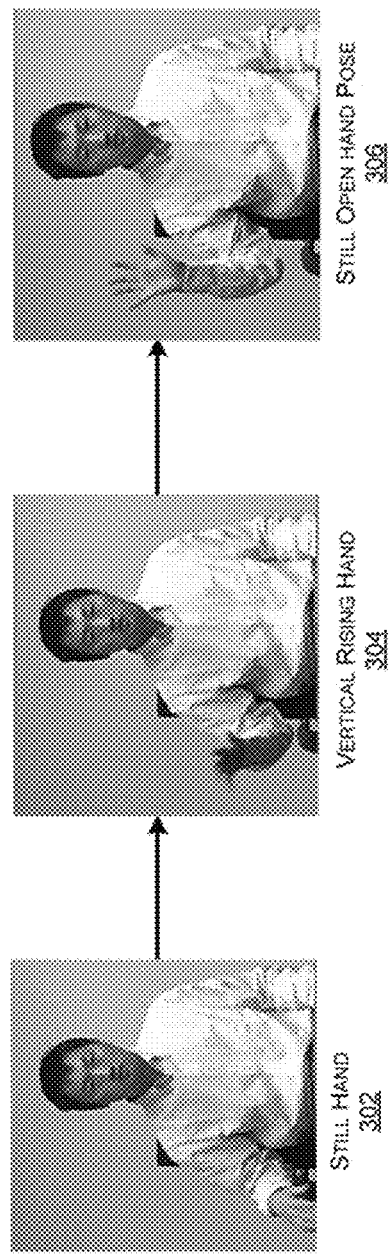
FIG. 3 illustrates an exemplary hand gesture definition of a greeting gesture.

FIG. 2 is a flow chart illustrating an exemplary first stage of determining a candidate search area for use in hand gesture detection. As shown in FIG. 2, video frames containing one or more images of a hand gesture are received (step 202). FIG. 3 is an exemplary hand gesture definition for a greeting gesture. In general, each hand gesture may be described as one of more sequential actions or states of the hand. For example, some hand gestures may be described as a single image such as an "open hand" that may signal the start of communication by gestures, or a "closed fist" that may signal the end of communication by gesture. Other hand gestures may be predefined as a series of hand positions that, together, comprise a hand gesture. For example, a greeting gesture may be defined as a vertical rising hand 304, followed by a still open hand pose 306. The hand may be kept still (e.g., still hand 302) at the beginning or at the end. FIG. 3 shows only one exemplary hand gesture definition, but other types of gestures may be similarly decomposed into simpler motions and stored as a gesture definition.

The received video frames may be downscaled to a lower resolution (step 204). In certain embodiments, video frames are downscaled to improve processing speed. In some exemplary embodiments, the resolution of video frames may be downscaled differently in the vertical and horizontal directions, such that the downscaled video frames may have a higher resolution in one direction than in the other. The decision to do so may be based, for example, on the type or features of the hand gesture being detected. For example, if the hand gesture being detected includes a vertical rising motion of a hand, then the resolution of the captured video frames (e.g., 1280-by-720 pixel) may be reduced to a lower resolution (e.g., 32-by-36 pixel) using different scales in the horizontal direction (e.g., 40:1) and the vertical direction (e.g., 20:1). Retaining higher resolution in the vertical direction may make it easier and more accurate to detect a vertical rising motion of the hand.

Next, an initial motion region is determined (step 206). If the received video frames have been downscaled, the determination is based on the downscaled video frames. Any conventional methods for determining a motion region in video frames may be used.

Figure 4:
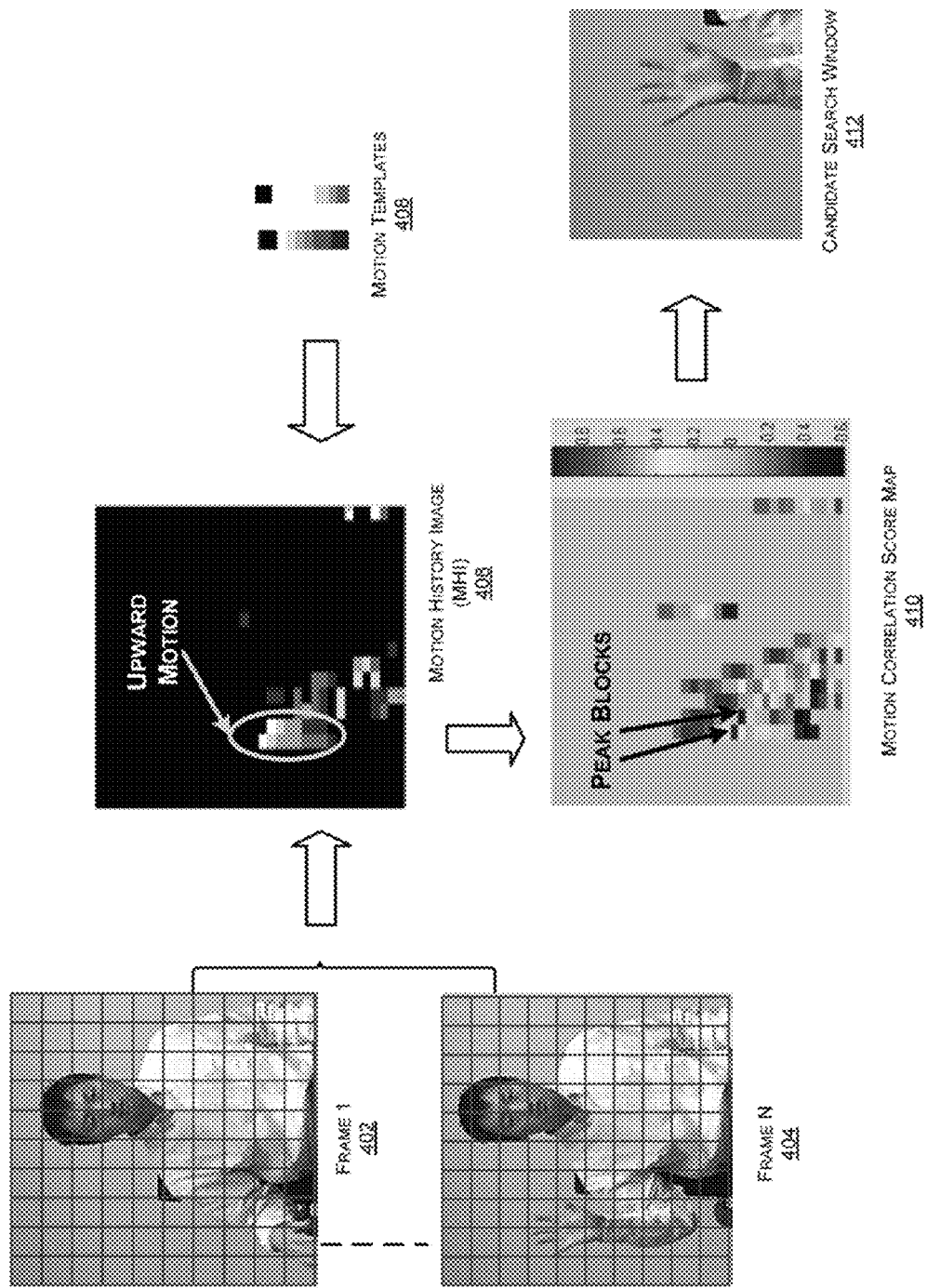
FIG. 4 illustrates one exemplary method for identifying a motion region using a motion history image (MHO.

FIG. 4 illustrates one exemplary method for identifying a motion region using a motion history image (MHI). An MHI is a layered motion image that represents the range of times between frames in a series of frames in a single image. To construct an MHI, the downscaled video frames may be segmented into blocks as illustrated by, for example, frames 402 and 404 of FIG. 4. Blocks may be any size, however, in some embodiments, it may be preferable to define a block as having a height smaller than its width or vice versa. Block size, and whether the block should be defined as square or rectangular, may be determined based on the type of gestures or motions expected in the received video. For example, if a hand gesture including a vertical rising motion is expected, defining blocks as rectangular and having a smaller height than width, may enhance efficiency by allowing more accurate capture and detection of motion in the frames. In some embodiments, block size may be defined based on other factors, such as expected image size. For example, if larger gestures are expected or hand gestures will be captured in close proximity to the image capture device, a larger block size may be sufficient. However, if hand gestures will be made farther from the image capture device, and therefore the hand gesture may appear smaller in the image frames, a smaller block size may be more appropriate. In certain embodiments, block size may be determined on the fly and may change depending on such factors as distance of the person making the gesture from the image capture device. In a video game context, for example, a player may be at varying distances from the image capture device during various stages of a video game. If the distance can be detected, or determined by, for example, information in the video frames, it can be used to determine block size.

As shown in FIG. 4, temporal motion information in frames 402 to 404 may be used to generate a single MHI 406. As shown in FIG. 4, pixel intensity and/or color may be varied to show recency of motion. For example, if it is determined that the information in a block has not changed much between the first frame and the last frame, that block may be represented by black, as shown in FIG. 4. Conversely, if there is a lot of change in the image information from frame 1 to frame N, then the block in the MHI may be brightly lit. An MHI can use colors to indicate blocks with motion, or an MHI may be black and white and use only pixel intensity.

Motion between blocks in a frame may be determined by any known method including, for example, frame differencing. Each time an image (e.g., a pixel intensity) in the block changes (indicating a motion occurs) from a previous frame, the gesture detector can assign an integer value to a corresponding block in the MHI to make that block brighter; if an image in the block of a downscaled video frame does not change, the gesture detector can assign an integer value to a corresponding block in the MHI to make that block darker. After the MHI is completed, motion history of background and/or non-moving objects in the MHI are in black or dark.

The MHI may be used to generate a motion correlation score map 410. In exemplary embodiments, one or more motion templates may be stored in a database. The one or more motion templates correspond to a particular hand gesture defined by a hand gesture definition. Each motion template represents an expected MHI for the particular gesture at a particular speed. For a particular gesture defined by a hand gesture definition, the database may store multiple motion templates, each template representing the gesture at different speeds. While the database may store any number of motion templates, generally speaking, the more motion templates there are, the more accurate the motion detection can be.

MHI 406 is compared to the motion templates 408 and one or more "matching" templates are identified. To determine a "matching" template, cross-correlation may be performed. In addition, the results may be normalized. For example, as illustrated in FIG. 4, a motion correlation score map 410 may be generated. In motion correlation score map 410, peak blocks—locations with correlation scores exceeding a threshold—for each of motion templates 408 may be identified. A high correlation between some blocks in MHI 406 and a motion template 408 corresponding to a particular gesture at a particular speed indicates that the particular gesture is likely to be present in those blocks. By identifying the peak blocks, an initial motion region (not shown in FIG. 4) may be identified.

Next, the identified initial motion region may be refined (step 208) by, for example, eliminating or reducing false positives. Potential false positives of hand motions may be unintentional hand movements (e.g., moving hands during conversation), people walking around, moving objects in background, human body movements, and etc. Filtering may be used to reduce the size of the initial motion region. For example, false positives may be filtered out based on a predefined minimum or maximum size of hands, a motion pattern of the predefined hand gesture, and other features. The resulting motion region after filtering will be referred to as the refined motion region.

After refinement, it is determined whether the refined motion region still contains a hand motion pattern (step 210).

If no, the gesture detection process is restarted with newly received video frames (step 202). If it does, a candidate (motion) search window is determined (step 212). The candidate search window is an area of the video frames that is most likely to contain a hand gesture. The candidate search window may be provided (step 214) to the second stage for further processing.

Figure 5:
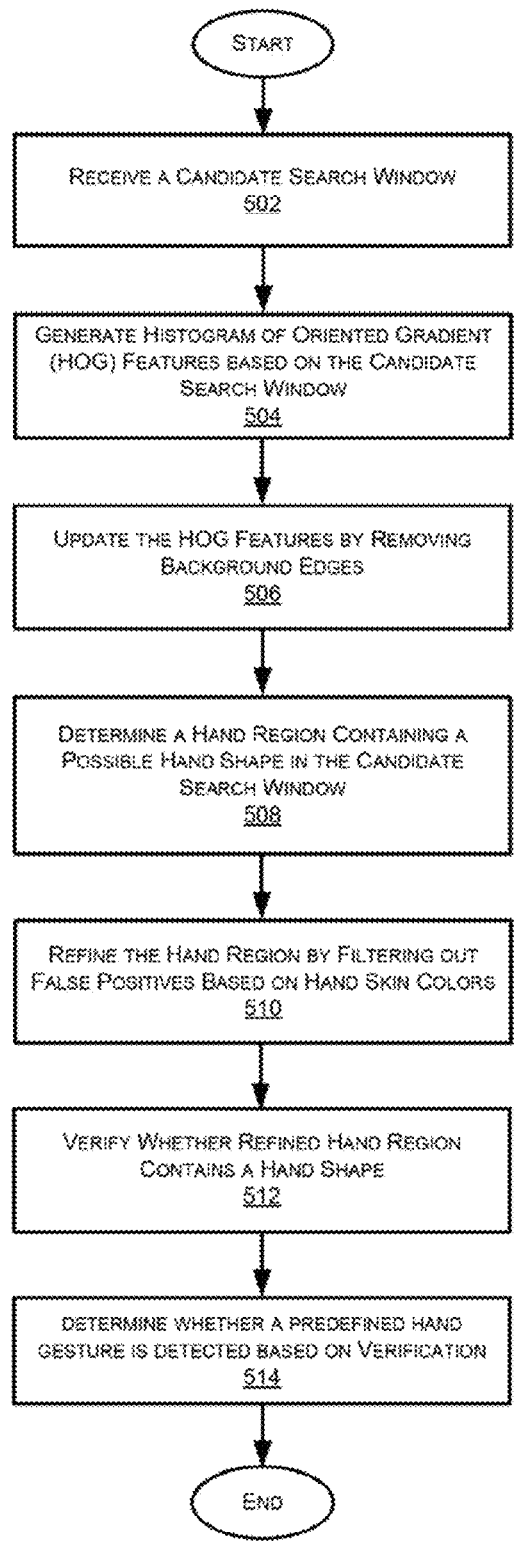
FIG. 5 is a flow chart illustrating an exemplary second stage of determining a specific hand gesture based on the candidate search area.

FIG. 5 is a flow chart illustrating an exemplary second stage of determining a specific hand gesture based on the candidate search area. Without departing from the exemplary embodiments, the exemplary process flow can be altered to delete steps, change the order of steps, or include additional steps.

In step 502, a candidate (motion) search window that may contain a hand gesture is received. In exemplary embodiments, a histogram of oriented gradient (HOG) features based on the candidate search window is generated (step 504).

Figure 6:
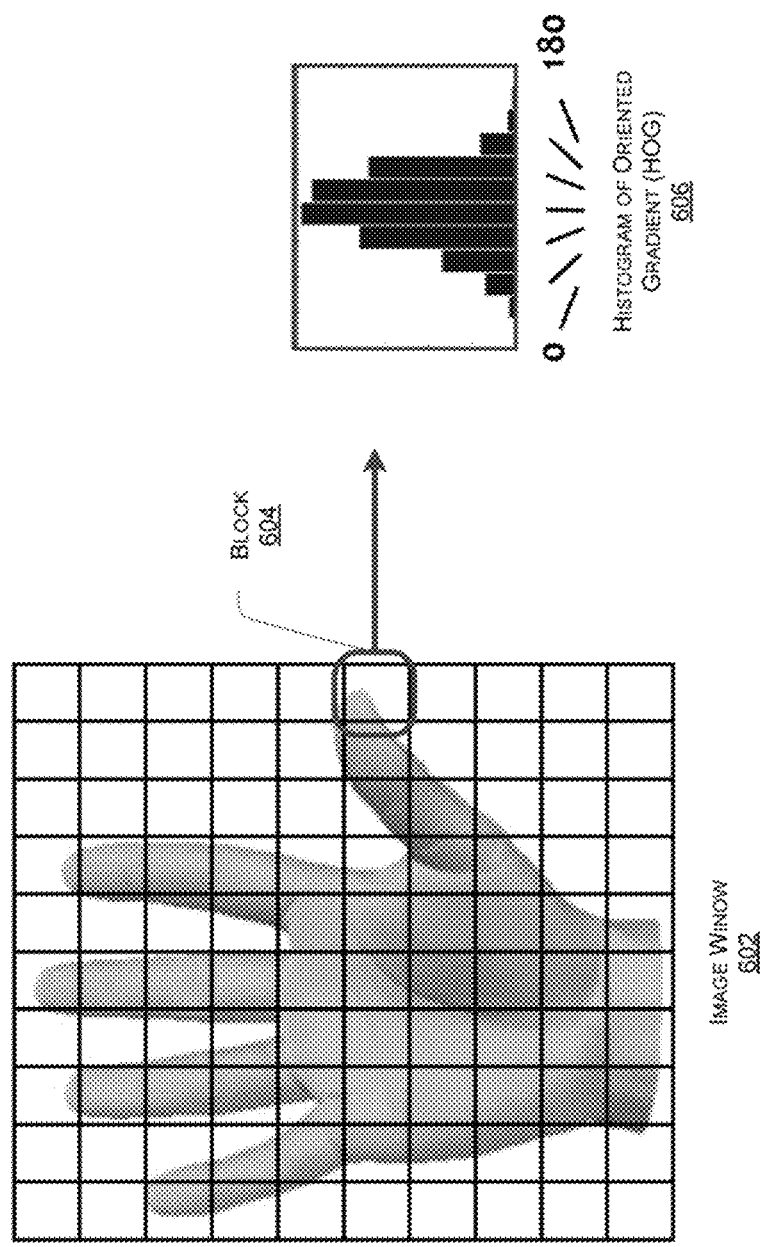
FIG. 6 illustrates an exemplary methodology for constructing a histogram of oriented gradient (HOG) features for a hand image.

HOG features can describe a local object appearance and shape, such as a hand shape, within an image window by distribution of local intensity gradients or edge directions. FIG. 6 illustrates an exemplary methodology for constructing HOG features for a hand image. As illustrated in FIG. 6, an image window 602 displaying a hand can be divided into blocks. Each pixel within a block has an edge (gradient) intensity value and an edge angle (orientation) value. For each block, a one-dimensional edge intensity histogram can be generated by accumulating edge intensity values over pixels within the block, and a one-dimensional edge angle histogram can be generated by accumulating edge angle values over the pixels within the block. A combination of the edge intensity histogram and the edge angle histogram for each block can form a local two-dimensional histogram for that block. FIG. 6 shows an exemplary HOG 606 for block 604. In some embodiments, a total weight of HOG features for each block can be normalized. For example, a total weight of orientation values for a block can be normalized to 1.

Each block can have a number of, say M, orientation bins (channels) in a 0°-180° (or 0°-360°) edge angle histogram, and thus has M feature components or a two-dimensional feature vector with M channels (one dimension for M channels or angles, and one dimension for edge intensity values). For example, as illustrated in FIG. 6, exemplary block 604 has 9=M orientation bins (channels) in a 0°-180° edge angle histogram and each orientation bin denotes a 20° angle (channel). Each orientation bin within block 604 can have a HOG feature component—a vector of corresponding edge intensity values.

In some embodiments, each block can be further divided into a number of smaller cells and a HOG for each cell within a block can be generated. After a HOG for each cell is generated, a HOG for the block can be generated by calculating a measure value of intensity of cells across the block and using the value to normalize HOG features of all cells within the block.

In some exemplary embodiments, a linear version of the HOG can be used. By using a linear normalization for a local histogram of each block, faster processing may be achieved. In other exemplary embodiments, a non-linear version of HOG can be used for more reliable results.

Optionally, the HOG features for the candidate search window may be updated by removing background edges (step 506). Removing background edges may reduce the scope of possible hand locations to a further limited area. The background edges may be removed by, for example, using frame differencing methods based on HOG features of the candidate search window and a corresponding region in reference downscaled video frames (e.g., earlier frames). To identify background edges, gradient intensity values of the candidate search window may be compared with gradient intensity values of the corresponding region in a reference frame (an earliest frame in the reference frames). Based on the comparison, locations whose gradient intensity values exceed a maximum threshold may be identified. The identified areas may be marked to be ignored in further processing by, for example, setting the gradient intensity values for the identified areas of the candidate search window to a lower value.

Next, a hand region containing a possible hand shape may be located in the candidate search window (step 508). The hand shape may be located by, for example, using a hand recognition method such as a linear classifier.

In some embodiments a linear support vector machine (SVM) classifier may be used to detect the presence of hand shape in a region of the candidate search window. An SVM is a binary classifier that performs classification by constructing a multidimensional hyperplane that can optimally separate data into two categories. For example, an SVM can be used to separate HOG features representing images in an image window into two categories, i.e., a hand shape or a non-hand shape. In some embodiments, the hyperplane can be oriented so that a margin (distance) from the hyperplane to a nearest support vector (data sets of any categories) on each side can be maximized. In some embodiments, a linear SVM, which has an (N−1)-dimensional hyperplane to classify a vector of N-dimensional data sets, can be used with HOG features of an image window for fast detecting a hand shape, e.g., an open hand. A linear SVM is fast but may be less reliable than a nonlinear SVM.

In exemplary embodiments, the linear SVM is trained with hand shape or gesture images. Training images typically include hand images from subjects of different races, genders, and ages, to improve accuracy of hand image detection. The training hand images may also be rotated to the left and/or the right some degrees (e.g., +10 and/or −10 degrees) to facilitate identification of hand images that are not exactly flat to the image capture device. In addition, the SVM can be trained with HOG features of backgrounds and other images for use in distinguishing the hand image from background and/or other objects.

Figure 7:
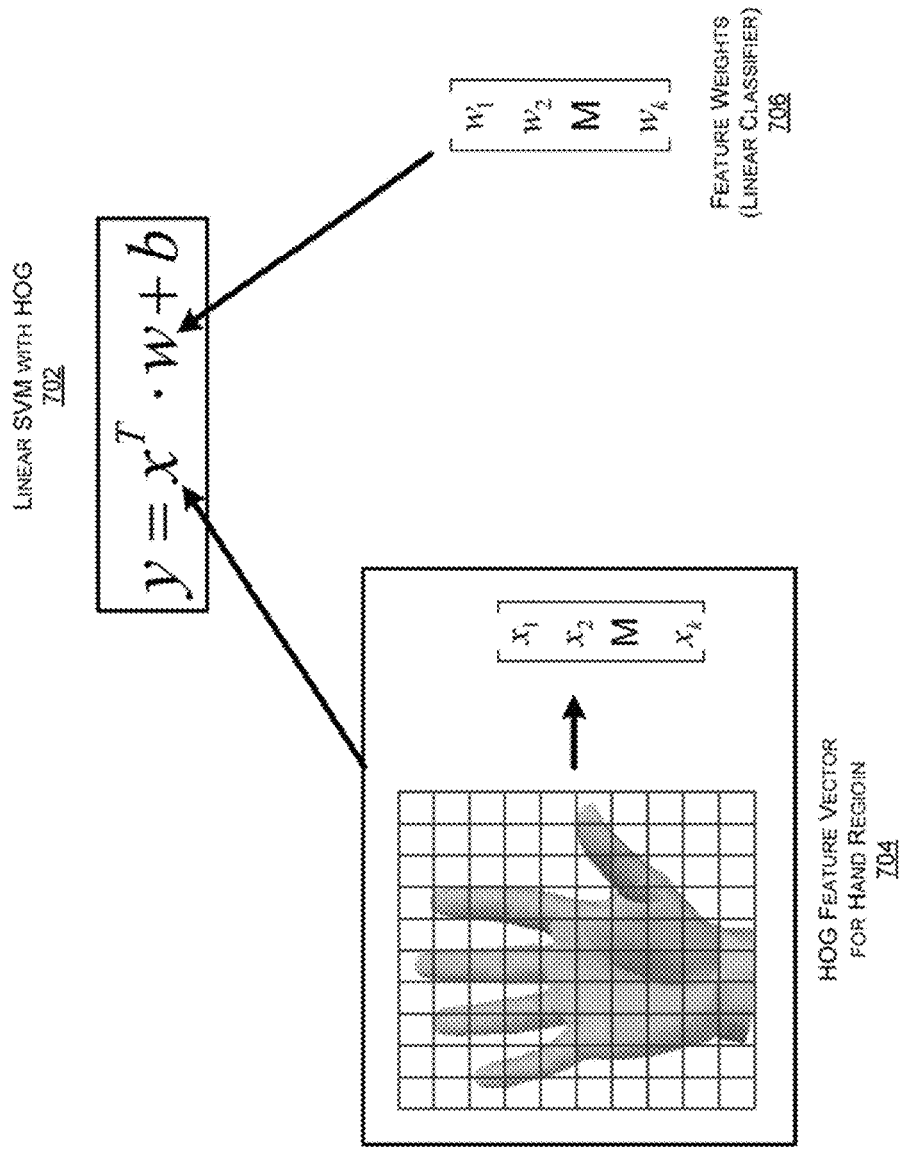
FIG. 7 illustrates an exemplary embodiment of a linear support vector machine (SVM) with HOG features.

In some embodiments, the determination of a hand region in the candidate search window may be performed using a linear SVM with HOG features. FIG. 7 illustrates an exemplary embodiment of a linear SVM with HOG features. The exemplary embodiment of the linear SVM with HOG features can be expressed as, for example:

$$y = x^T \cdot w + b$$

where y is a classification score of applying the linear SVM to HOG features of a possible hand shape in an image window; x is a one-dimensional HOG feature vector (e.g., $X_1$ through $X_k$) in a possible hand region 704 of the image window, and M histogram bin/channel values from each location (e.g., each block) are concatenated into this vector; $x^T$ is a transpose of the one-dimensional HOG feature vector; W is a linear classifier 706 acquired from the training of the linear SVM with HOG features of training images as described above, and can be represented by a one-dimensional vector of HOG feature weights (e.g., $W_1$ through $W_k$) with M histogram bin/channel values from each location concatenated into this vector; x and w have the same length; the product of x and w is a scalar; and b is a scalar bias acquired from the linear SVM training, and can be used as a threshold for determining whether a test image is a hand shape.

To reduce a scope of possible hand locations to further limited areas, background edges can be removed from a candidate search window, before HOG features for the candidate search window are fed into a SVM for hand shape detection. Background edge removal can speed up the hand shape detection.

Figure 8:
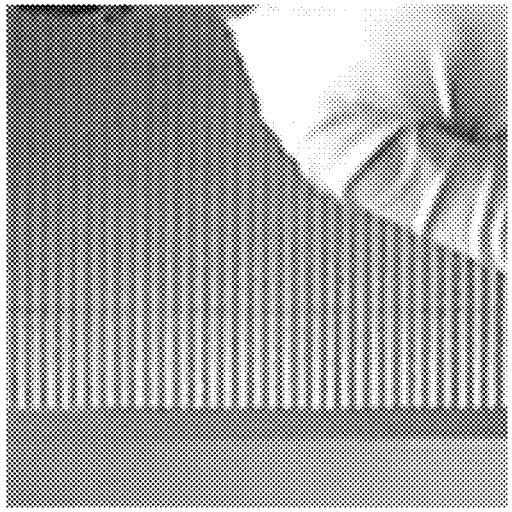
FIG. 8 illustrates an exemplary embodiment of background edge removal.
Figure 8:
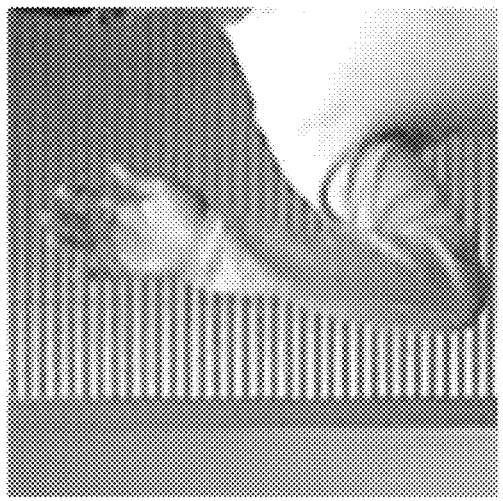

In some embodiments, background edges in the candidate search window can be removed from consideration using frame differencing with HOG features. For example, FIG. 8 illustrates exemplary background edge removal. In FIG. 8, a hand search range is identified in a current frame 802, and a same range can also be determined in reference video frames, e.g., reference frame 804. The hand search range includes background objects with edges, such as blinds in current frame 802 and reference frame 804. For fast and more accurate hand shape detection, those background edges can be removed.

Reference video frames are generally captured at a regular time interval, such as every 0.8 seconds. In many situations, only a limited number (e.g., two) of the most recent reference frames are stored in a memory. In some embodiments, the reference frames can be stored in a queue. When a new reference frame is captured, the earliest reference frame in the queue can be removed. In exemplary embodiments, the reference frame to be used for background edge removal is the earliest one still in the queue. HOG features (e.g., gradient intensity values and edge angle values) for the hand search range in a current frame and the corresponding range in the reference frame can be generated as previously described. The gradient intensity values for the hand search range in the current frame may be compared with gradient intensity values for the corresponding range in the reference frame. Locations in the hand search range with gradient intensity values exceeding a threshold may be identified. The gradient intensity values for the identified areas may be reset to a lower value, to reduce a magnitude of gradients at the background edge locations. Subsequently, when using an SVM with HOG features to detect a hand shape, the background edges may be ignored. This may improve efficiency and accuracy of hand shape detection. The threshold and low value for background edges can be acquired from the training of the SVM with HOG features.

Figure 9:
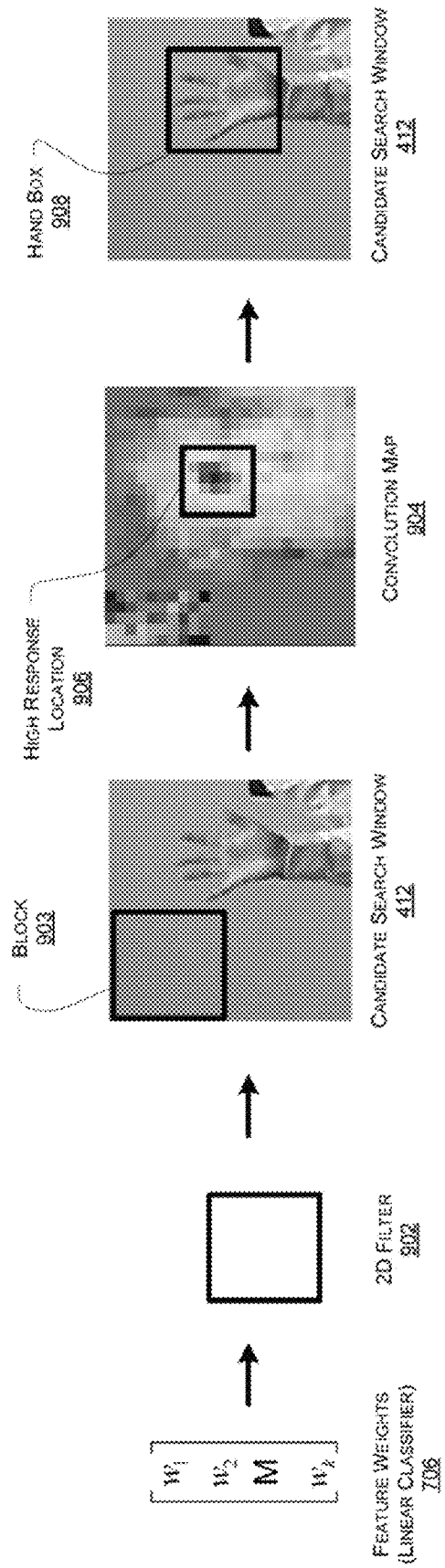
FIG. 9 illustrates an exemplary process flow of hand shape detection using a linear SVM based on HOG features.

FIG. 9 illustrates an exemplary process flow of hand shape detection by scanning the candidate search window with a linear SVM. As illustrated in FIG. 9, the feature weights (linear classifier 706) may be represented as a 2D filter 902. Filter 902 may be used to scan a candidate search window and classify regions of candidate search window 412 based on whether the region is likely to contain a hand image.

In some embodiments, this 2D convolution process may be implemented as a linear SVM, e.g., $y = x^T \cdot w + b$ as illustrated in FIG. 7, as applied to HOG features of blocks in the candidate search window. The HOG features of an image at the location can be inputs of x, HOG feature weights of linear classifier 706 can be inputs of w, and a scalar bias acquired from the linear SVM training can be applied as b. The classification score of Y can be used as a convolution response, and later on be used to determine whether an image in the block being scanned belongs to a hand shape or a non-hand shape.

By applying filter 902 to each block, e.g., block 903, in candidate search window 412, a convolution map 904 may be generated. Areas of high intensity in convolution map 904 indicate areas of candidate search window 412 that likely contain a hand image. A corresponding hand box region 908 within candidate search window 412 may be determined once a high response location 906 within convolution map 904 is identified. The convolution response y is compared to a threshold. If the convolution response y is larger than the threshold, then the box region around the high response location is determined as a hand box region.

Referring back to FIG. 5, in certain exemplary embodiments, the hand region may optionally be verified or further refined based on skin color (step 510). Hand skin colors can be expressed in any color model, e.g., RGB color model, and in any color encoding model, e.g., YCbCr. For example, a hand skin model in YCbCr model can be expressed as 77≤Cb≤127 and 133≤Cr≤173. If video frames 105 (and their corresponding downscaled video frames) are in color, skin color verifier 212 can determine a skin region (in a hand location, e.g., hand box 908 of FIG. 9) that matches one or more definitions of hand skin colors. Skin color verifier 212 can further determine whether the skin region belongs to a hand, based on predefined area size thresholds for a hand skin region. For example, in some embodiments, skin color verifier 212 can determine that if an area of the hand skin region occupies more than 25% (but less than a certain percentage) of hand box 908, then the hand skin region may be a hand. The skin region that fails the above skin verification can be removed from further consideration. Conversely, any object whose colors fail to meet the predefined hand skin colors may be removed from the hand region. Skin color verification can further reduce the scope of possible hand locations to further limited areas.

Next, further verification may be performed using a non-linear classifier (step 512). In some embodiments, a SVM classifier with a nonlinear kernel may be used to do the verification. The nonlinear kernel function maps a list of multidimensional data sets (e.g., HOG features) representing the refined hand region onto a higher dimensional feature space. The mapping (transformation) converts a non-linear classification problem into a linear classification problem. And then, a linear classifier in that higher dimensional feature space may be used to classify the data sets into two categories (e.g., a hand shape or a non-hand shape).

The nonlinear kernel function can be a homogeneous polynomial function, a non-homogeneous polynomial function, a radial basis function, a Gaussian radial basis function, a hyperbolic tangent function, or any other type of nonlinear functions. Based on results of classification/verification by the SVM classifier with a nonlinear kernel, a final decision can be made as to whether the refined hand region contains a hand shape, and determine whether a hand gesture is detected (step 514).

In some embodiments, a SVM with a nonlinear kernel can be expressed as, for example, $$y=k(x)\cdot w+b$$

where y is a classification score of applying the nonlinear SVM to multidimensional data sets (e.g., HOG features) representing a detected hand shape in an image window, e.g., hand box 908 of FIG. 9; X is an N-dimensional data sets (e.g., the above described HOG features) representing the detected hand shape, and N≥2; k(x) is a nonlinear mapping function for mapping the N-dimensional data sets onto a M-dimensional feature space, and M≥N; W is a linear classifier (e.g., linear classifier 706 of FIG. 7) acquired from the above described training of a linear SVM based on HOG features of training images, and can be represented by a vector of multidimensional HOG feature weights; and b is a scalar bias acquired from the linear SVM training, and can be used as a threshold for determining whether a test image is a hand shape. In some embodiments, the data sets representing the detected hand shape can be a linear version of HOG features, or a nonlinear version of HOG features, as described above.

Figure 10:
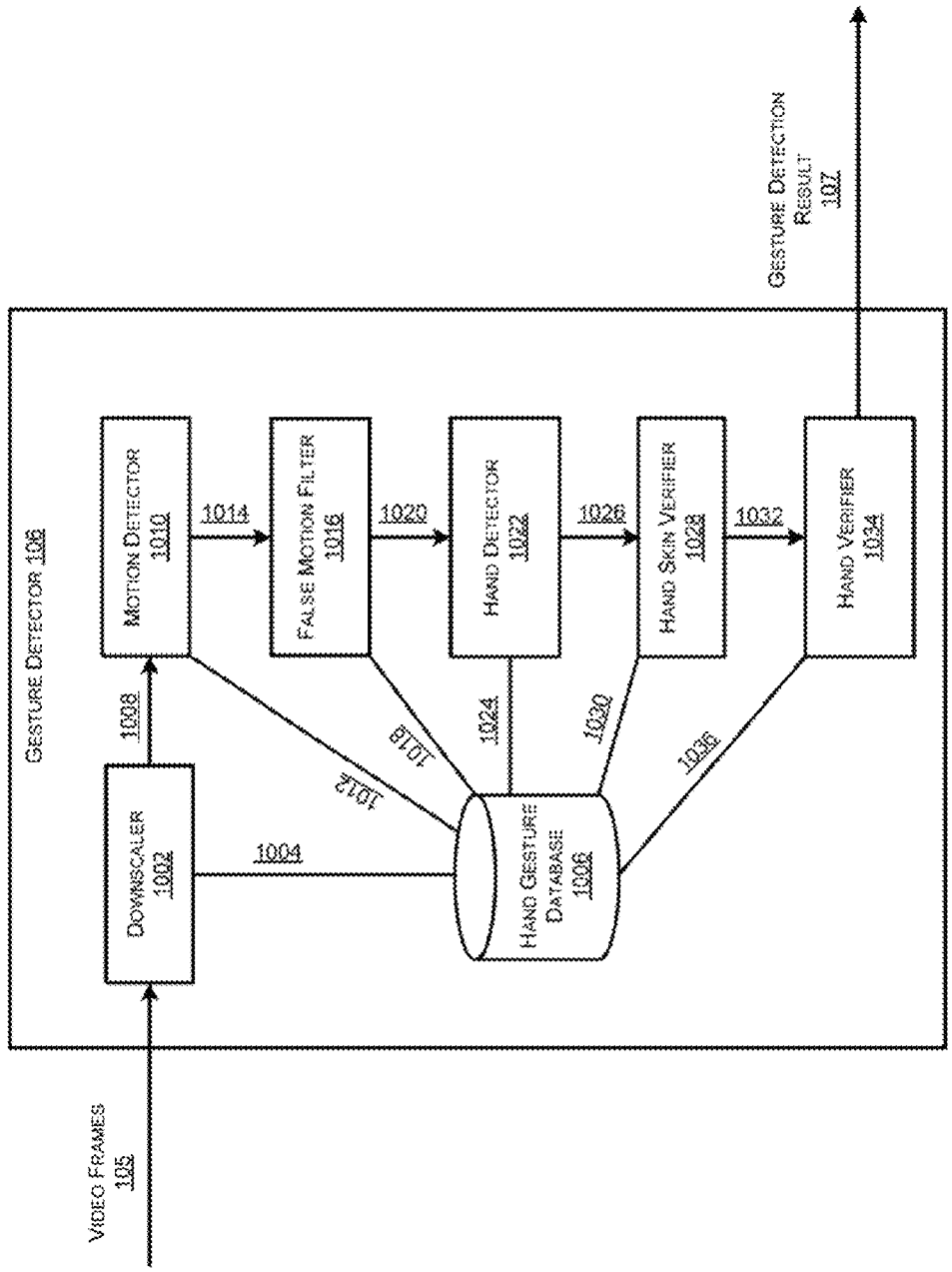
FIG. 10 is a block diagram illustrating one exemplary embodiment of a gesture detector 106 in the exemplary system 100 of FIG. 1.

FIG. 10 is a block diagram illustrating one exemplary embodiment of a gesture detector 106 in the exemplary system 100 of FIG. 1. As shown in FIG. 10, gesture detector 106 may include a downscaler 1002, a hand gesture database 1006, a motion detector 1010, a false motion filter 1016, a hand detector 1022, a skin color verifier 1028, and a hand verifier 1034.

One or more of the components depicted in FIG. 10 may be implemented in software on one or more computing systems. For example, they may comprise one or more applications, which may comprise one or more computer units of computer-readable instructions which, when executed by a processor, cause a computer to perform steps of a method. Computer-readable instructions may be stored on a tangible computer-readable medium, such as a memory or disk. Alternatively, one or more of the components depicted in FIG. 10 may be hardware components or combinations of hardware and software such as, for example, special purpose computers or general purpose computers.

With reference to FIG. 10, downscaler 1002 receives video frames 105 in one resolution and downscales the video frames to a lower resolution. Downscaling may be performed in any of the ways described above. In some embodiments, downscaler 1002 may store the downscaled video frames in hand gesture database 204 (step 1004), or pass the downscaled video frames to motion detector 1010 (step 1008).

Hand gesture database 1006 can be used for storing a collection of data related to hand gestures. The storage can be organized as a set of queues, a structured file, a relational database, an object-oriented database, or any other appropriate database. Computer software, such as a database management system, may be utilized to manage and provide access to the data stored in hand gesture database 1006. Hand gesture database 1006 may store, among other things, hand gesture configuration information, which may include but is not limited to, hand gesture definitions, motion templates corresponding to each hand gesture definition, minimum and maximum sizes of hands, hand shapes, hand skin colors, hand training images for training hand detector 1022, and other information for use in hand gesture detection. In some embodiments, hand gesture database 1006 may store downscaled video frames.

Motion detector 1010 detects a hand motion based on stored hand gesture definitions and other data relating to hand gestures. Motion detector 1010 can acquire necessary information from hand gesture database 1006 or downscaler 1002 (steps 1008 and 1012). In some exemplary embodiments, motion detector 1010 generates a motion history image (MHI) based on the downscaled video frames, searches for a hand motion in the motion history image, and determines a motion region containing a hand motion. By doing so, motion detector 1010 may reduce the scope of possible locations for detecting a hand motion. Motion detector 1010 may pass the motion region to false motion filter 1016 (step 1014).

False motion filter 1016 can refine the motion region by filtering out false positives of hand motions. The false motion filtering can further reduce the scope of possible hand locations to further limited areas. The false positive removal is further described below.

False motion filter 1016 can filter out false positives based on stored hand gesture configuration information such as, for example, a predefined minimum or maximum size of hands, a motion pattern of a predefined hand gesture, and etc. False motion filter 1016 can acquire the hand gesture configuration information from hand gesture database 1006 (step 1018). For example, FIG. 11 illustrates an exemplary embodiment of false hand motion removal based on a moving object size and a predefined maximum size of hands. As illustrated in FIG. 11, based on downscaled video frames containing a human's moving torso (e.g., a moving object 1102), a corresponding MHI 1104 and a motion correlation score map (not shown in FIG. 11) may be constructed using frame differencing and motion template matching as described above. False motion filter 1016 of FIG. 10 may check peak blocks in the motion correlation score map to find and remove those peak blocks within a moving area of a size exceeding a predefined size threshold. The predefined size threshold may be a predefined maximum size of hands, for examples, 60 blocks. After removing those peak blocks, false motion filter 1016 can refine the motion region detected by motion detector 1010.

For another example, false hand motion removal can be based on a motion pattern of a predefined hand gesture. For example, a predefined hand gesture, e.g., the greeting gesture illustrated in FIG. 3, may include an assumption that the upward moving hand should remain still at the end of movement. Accordingly, peak blocks in a corresponding motion correlation score map should stay still for a predefined minimum time interval, for example, for at least 4 frames (e.g., 0.4 seconds) within next 8 frames (e.g., 0.8 seconds). False motion filter 1016 of FIG. 10 can remove those peak blocks violating this constraint, and refine the motion region detected by motion detector 206.

Based on the refined motion region, in some embodiments, false motion filter 1016 can determine a corresponding motion search window in a downscaled video frame. The motion search window may contain a predefined hand pose/shape. False motion filter 1016 can provide the motion search window to hand detector 1022 (step 1020).

Upon receiving the motion search window, hand detector 1022 can detect a predefined hand shape using any kind of hand shape recognition methods. In some embodiments, hand detector 1022 can construct HOG features for the motion search window, and remove background edges from the motion search window using frame differencing and the HOG features, as described above. And then, hand detector 1022 can scan the motion search window to detect the predefined hand shape using a linear classifier with HOG features, as described above. For background edge removal and hand shape detection, hand detector 1022 may retrieve (step 1024) from hand gesture database 1006 or receive (step 1020) from false motion filter 1016 the hand gesture configuration information (e.g., predefined hand shapes) and the downscaled video frames. Hand detector 1022 can determine a hand region containing the detected hand shape, and provide the hand region to hand skin verifier 1028 for further verification (step 1026).

After receiving (step 1026) the hand region, hand skin verifier 1028 can apply the above described hand skin color verification to the hand region to remove false positives of hand shapes. For hand skin color verification, hand skin verifier 1028 may retrieve (step 1030) from hand gesture database 1006 or receive (step 1026) from the communication pipeline flows the hand gesture configuration information (e.g., hand skin colors, maximum or minimum hand sizes). Hand skin verifier 1028 can refine the hand region by removing false positives therefrom, and thus further reduce the scope of possible hand locations to further limited areas. After that, hand skin verifier 1028 can pass (step 1032) the refined hand region to hand verifier 1034.

Hand verifier 1034 can verify a hand shape using any conventional method. A linear classifier, e.g., a linear SVM, used by hand detector 1022 can fast detect a hand location that may contain a hand shape. But the detection result may need further verification for accuracy, e.g., by a nonlinear classifier, which is more reliable but is slower than a linear classifier. Thus, a linear classifier and skin verification may be utilized to reduce the scope of possible hand locations to limited areas, then a nonlinear classifier is used to verify whether the limited areas contain a predefined hand shape, and make a final determination whether a predefined hand gesture is detected. In some embodiments, hand verifier 1034 may adopt an above described SVM with a nonlinear kernel to perform the verification.

Hand verifier 1034 may retrieve (step 1036) from hand gesture database 1006 or receive (step 1032) from the communication pipeline flows the hand gesture configuration information, and verify whether the refined hand region received (step 1032) from hand skin verifier 1028 contains the predefined hand shape. Hand verifier 1034 can verify whether a detected hand shape is a predefined hand shape, determine whether a predefined gesture is detected based on the verification, and provides (107) the determination to user device 108.

During the above described gesture detection process, each component of gesture detector 106 may store its computation/determination results in hand gesture database 1006 for later retrieval or training purpose. Based on the historic data, gesture detector 106 may train itself for improved accuracy.

The methods disclosed herein may be implemented as a computer program product, i.e., a computer program tangibly embodied in an information carrier, e.g., in a machine readable storage device, or a tangible computer readable medium, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing hand gesture detection disclosed herein.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

What is claimed is:

1. A computer-implemented method for detecting presence of a hand gesture in video frames, the method comprising:
receiving video frames having an original resolution;
downscaling the received video frames into video frames having a lower resolution;

detecting a motion corresponding to the predefined hand gesture in the downscaled video frames based on temporal motion information in the downscaled video frames;

detecting a hand shape corresponding to the predefined hand gesture in a candidate search window within one of the downscaled video frames using a binary classifier, wherein the candidate search window corresponds to a motion region containing the detected motion; and determining whether the received video frames contain the predefined hand gesture based on the hand shape detection.

2. The method of claim 1, wherein detecting the motion comprises:

generating a motion history image (MHI) based on the temporal motion information, wherein the MHI represents recency of motions in the downscaled video frames;

perform template matching by a normalized cross-correlation of a plurality of motion templates in the MHI, wherein the plurality of motion templates correspond to the predefined hand gesture performed at different speed; and detecting the motion based on correlation scores.

3. The method of claim 1, further comprising:

refining the motion region by filtering out a false motion based on an area size of and/or a pattern of the detected motion; and determining the candidate search window based on the refined motion region.

4. The method of claim 1, further comprising:

refining the candidate search window by removing background edges based on gradient intensity values of the background edges in the candidate search window and in a corresponding region of a reference downscaled video frame; and detecting the hand shape in the updated candidate search window using the binary classifier.

5. The method of claim 1, wherein detecting the hand shape comprises:

generating histogram of oriented gradient (HOG) features based on the candidate search window, wherein the HOG features correspond to gradient intensity values and edge orientation values of each region in the candidate search window; and detecting the hand shape in the candidate search window using the binary classifier based on the generated HOG features.

6. The method of claim 5, wherein detecting the hand shape in the candidate search window using the binary classifier based on the generated HOG features comprises:

scanning the candidate search window using a two-dimensional filter corresponding to the binary classifier based on the generated HOG features;

generating a convolution response map based on the scan;

detecting a high response location in the convolution response map; and detecting the hand shape in the candidate search window based on the high response location.

7. The method of claim 1, wherein the binary classifier can be a linear support vector machine (SVM) classifier or a nonlinear SVM classifier.

8. The method of claim 1, further comprising:

verifying the detected hand shape based on predefined hand skin colors; and determining whether the received video frames contain the predefined hand gesture based on the verification.

9. The method of claim 1, further comprising:

determining a hand region containing the detected hand shape;

refining the hand region by filtering out false skin regions based on predefined hand skin colors;

verifying whether the refined hand region contains a hand shape corresponding to the predefined hand gesture using a nonlinear classifier; and determining whether the received video frames contain the predefined hand gesture based on the verification.

10. The method of claim 1, further comprising:

verifying the detected hand shape using a nonlinear classifier based on histogram of oriented gradient (HOG) features, wherein the HOG features correspond to gradient intensity values and edge orientation values of a hand region corresponding to the detected hand shape; and determining whether the received video frames contain the predefined hand gesture based on the verification.

11. An apparatus for detecting a hand gesture in video frames having an original resolution, the apparatus comprising:

a non-transitory memory for storing:

a downscaler to downscale the received video frames into video frames having a lower resolution;

a motion detector to determine a motion region by detecting a motion corresponding to a predefined hand gesture in the downscaled video frames based on temporal motion information in the downscaled video frames;

a hand detector to determine a hand region by detecting a hand shape corresponding to the predefined hand gesture in a candidate search window within one of the downscaled video frames using a linear classifier, wherein the candidate search window corresponds to the motion region; and a hand verifier to verify whether the hand region contains a hand shape of the predefined hand gesture using a nonlinear classifier, and to determine whether the received video frames contain the predefined hand gesture based on the verification; and a processor for executing the downscaler, the motion detector, the hand detector and the hand verifier.

12. The apparatus of claim 11, wherein the motion detector is configured to:

generate a motion history image (MHI) based on the temporal motion information, wherein the MHI represents recency of motions in the downscaled video frames;

perform template matching by a normalized cross-correlation of a motion template in the MHI, wherein the motion template corresponds to the predefined hand gesture; and determine the motion region based on correlation scores.

13. The apparatus of claim 11, wherein the motion detector is configured to:

define a plurality of motion templates corresponding to the predefined hand gesture performed at different speed; and detect the motion corresponding to the predefined hand gesture in the downscaled video frames based on the temporal motion information and the plurality of motion templates.

14. The apparatus of claim 11, further comprising:

a false motion filter to refine the motion region by filtering out false positives based on a definition of the predefined hand gesture and/or a predefined maximum or minimum size of hands, and to determine the candidate search window based on the refined motion region.

15. The apparatus of claim 11, wherein the hand detector is configured to:
   generate histogram of oriented gradient (HOG) features based on the candidate search window, wherein the HOG features correspond to gradient intensity values and edge orientation values of each region in the candidate search window;
   update the HOG features by resetting gradient intensity values of background edges to a predefined lower value based on comparing gradient intensity values of a region in the candidate search window with gradient intensity values of a corresponding region in an earlier downscaled video frame; and
   detect the hand shape in the candidate search window using a linear support vector machine (SVM) classifier based on the updated HOG features.

16. The apparatus of claim 11, further comprising:
   a skin color verifier to refine the hand region by filtering out a false skin region based on predefined hand skin colors.

17. The apparatus of claim 16, wherein the hand verifier is configured to:
   verify whether the refined hand region contains the hand shape of the predefined hand gesture using a nonlinear support vector machine (SVM) classifier based on histogram of oriented gradient (HOG) features, wherein the HOG features correspond to gradient intensity values and edge orientation values of the refined hand region.

18. A system comprising:
   a camera configured to capture images, the captured images having an original resolution; and
   a gesture detector coupled to the camera and configured to
      downscale the captured images into images having a lower resolution,
      determine a motion region by detecting a motion corresponding to a predefined hand gesture in the downscaled images based on a motion history image (MHI) and a plurality of motion templates, wherein the MHI represents recency of motions in the downscaled images, and the plurality of motion templates correspond to the predefined hand gesture performed at different speed,
      refine the motion region by filtering out a false motion based on configuration information of the predefined hand gesture and the detected motion,
      determine a hand region by detecting a hand shape corresponding to the predefined hand gesture in a candidate search window using a linear classifier, wherein the candidate search window is within one of the downscaled images and corresponds to the refined motion region,
      refine the hand region by filtering out a false skin region based on hand skin colors, and
      determine whether the captured images contain the predefined hand gesture by verifying the detected hand shape in the refined hand region using a nonlinear classifier.

19. The system of claim 18, wherein the gesture detector has been trained using a support vector machine (SVM) classifier based on histogram of oriented gradient (HOG) features of training images to recognize a hand of different races, genders, shapes, and sizes, and to distinguish a hand from background objects and other non-hand objects.

20. A non-transitory computer-readable medium storing instructions that, when executed, cause a computer to perform a method for hand gesture detection, the method comprising:
   receiving video frames having an original resolution;
   downscaling the received video frames into video frames having a lower resolution;
   detecting a motion corresponding to the predefined hand gesture in the downscaled video frames based on temporal motion information in the downscaled video frames;
   detecting a hand shape corresponding to the predefined hand gesture in a candidate search window within one of the downscaled video frames using a binary classifier, wherein the candidate search window corresponds to a motion region containing the detected motion; and
   determining whether the received video frames contain the predefined hand gesture based on the hand shape detection.

* * * * *